INVENTOR
JOHN C. DE NIRO
BY
Frederick W. Padden
ATTORNEY

United States Patent Office 3,506,020
Patented Apr. 14, 1970

3,506,020
VEHICLE WASHER EQUIPMENT
John C. DeNiro, Watchung, N.J., assignor to Raymond W. Palmer, East Orange, N.J.
Filed Jan. 17, 1968, Ser. No. 698,504
Int. Cl. B60s 3/04
U.S. Cl. 134—45                                             8 Claims

ABSTRACT OF THE DISCLOSURE

An automatic drive-in vehicle washing system as disclosed having an under the vehicle washing mechanism and a vertically reciprocating spray frame for spraying water and detergent for washing the sides and top of the vehicle. An electrical control circuit comprising a stepping sequence switch, timers and relays is utilized for controlling all washing operations including the reciprocation of the spray frame and the injection of water and detergent by means of valves and a pump during the frame reciprocation.

BACKGROUND OF THE INVENTION

This invention is concerned with washing apparatus and particularly to apparatus for automatically washing motor vehicles.

The development of vehicle washing systems has progressed in recent years to the extent that a variety of automatic and semiautomatic arrangements have become commercially available for washing cars and trucks. Many such arrangements operate automatically to apply water and detergent in predetermined cycles for washing vehicles. Although prior art arrangements are technically reliable, they generally are time consuming because many manual operations are needed for initiating and controlling the washing operations. In addition, undesirable wastes of water and detergent typically occur due to purging of lines during intervals between water rinsing and detergent cycles of vehicle washing. Moreover, complex and expensive washing control circuitry has heretofore been required for regulating the various vehicles washing and rinsing cycles.

In view of the foregoing, it is an object of the present invention to provide a vehicle washing system which is fully automatic and utilizes simple and economical facilities for controlling vehicle washing and rinsing cycles with reduced water and detergent wastes.

SUMMARY OF THE INVENTION

The foregoing object and others are attained in accordance with a specific illustrative embodiment of the invention in which a simple and economical electrical control circuit is utilized in a washing system for controlling the automatic washing and rinsing of the under and top surfaces and sides of a vehicle such as a truck. The washing system is a so-called drive-in arrangement in which a vehicle drives under a structure having four posts supporting a substantially rectangular spray frame which vertically reciprocates under control of up and down drive mechanisms and cable pulley devices. The spray frame comprises a plurality of multi-angle apertures or nozzles for spraying water and detergent onto a vehicle during the up and down movement. Water and detergent are selectively supplied to the spray frame via a pump and respective water and detergent valves connected to water and detergent supplies.

The electrical control circuit controls the water and detergent valves as well as the pump selectively to supply water and detergent to the spray frame during reciprocation. A stepping switch sequence circuit is utilized in the control circuit for programming the washing and rinsing operations for a vehicle. The stepping switch also controls the operation of the up and down drive mechanisms for reciprocation of the spray frame. The control circuit in actuating the water and detergent valves provides for purging with minimal wastes and clogging thereof by switching water and detergent off and on sequentially rather than at the same time. In accordance with one aspect of the invention, the circuitry is simplified by switching only the detergent valve and selectively retaining either a full or partial volume of water on during the entire washing operation. Timer circuitry is included in the control circuit for regulating the height movement of the spray frame, the detergent cycle, and a pause interval during which a detergent is enabled to penetrate and loosen dirt on a vehicle. Limit switches form part of the electrical control circuit and are mounted on the posts at discrete positions to control the injecting of detergent, switch stepping operations, and vertical movement of the spray frame.

An under the vehicle washing mechanism is provided in the system and it is operated under control of the electrical control circuit to wash the under surface of the vehicle for a timed period as it is being driven into a desired position under the spray frame. Operations are then stopped to await a single manual operation of a start switch which then initiates the fully automatic washing of the vehicle.

DESCRIPTION OF THE DRAWINGS

The foregoing objects, features and advantages of the present invention will be more clearly understood from a reading of the following description with reference to the drawing in which.

DESCRIPTION OF PREFERRED EMBODIMENT

Figure 1:
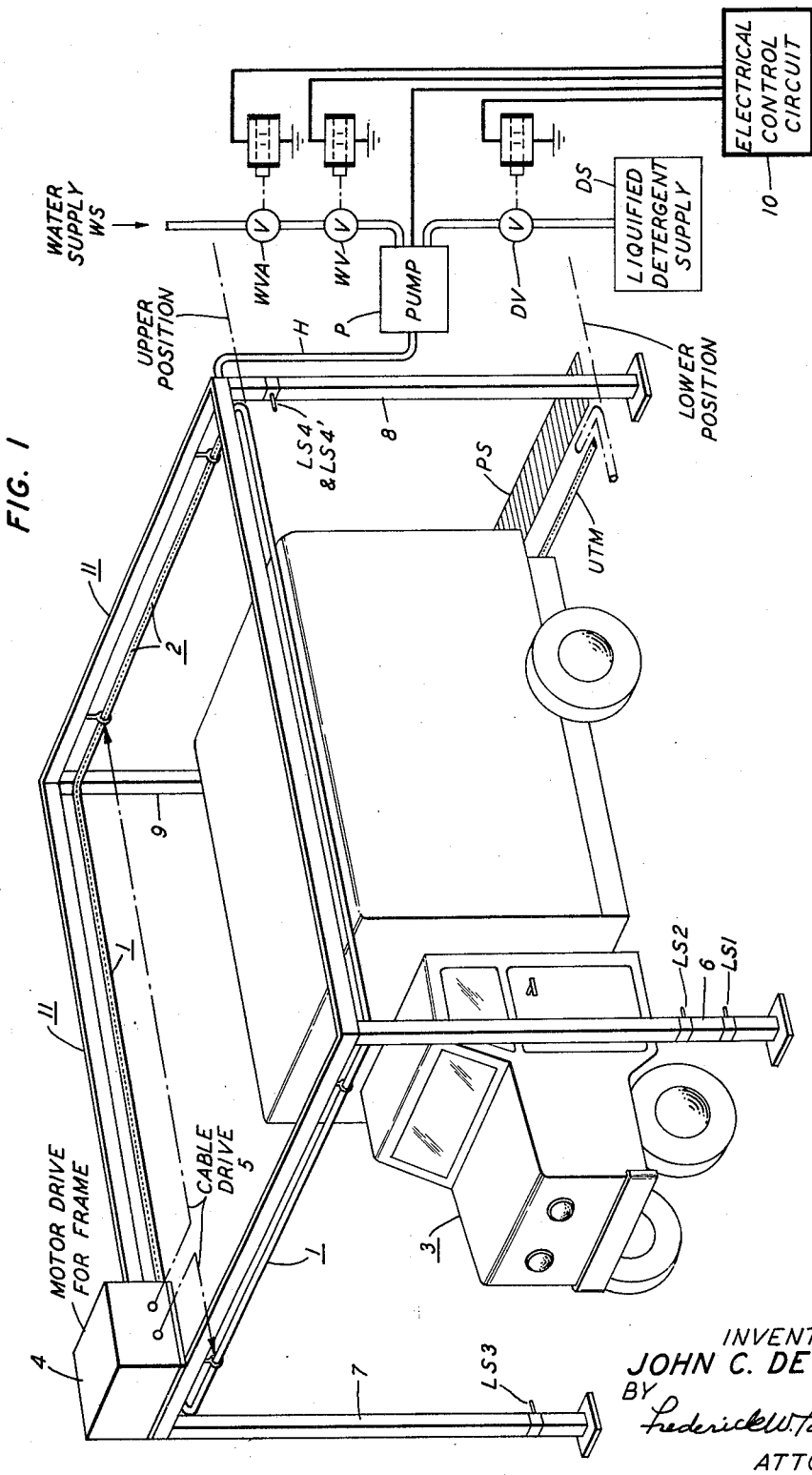
FIG. 1 illustrates a drive-in truck washing system having a vertically reciprocating spray frame which sprays water and liquified detergent from respective supplies thereof underneath and onto four sides of a truck in prescribed sequences under control of an electrical control circuit.

Referring to FIG. 1, the vehicle washer comprises a rectangular spray frame 1 for concurrently spraying all sides of a vehicle. Frame 1 has a plurality of inwardly directed nozzles or apertures 2 about its perimeter for selectively directing water and a cleansing substance, such as a liquified detergent soap, in a plurality of angular, inward sprays onto sides of the vehicle to be washed. The frame 1 is of tubular or pipe construction having a continuous passage for the water and soap about its perimeter to the nozzles 2. The length and width of frame 1 exceeds that of the vehicle to be washed. A vehicle 3 is depicted in FIG. 1 in a position to be washed under control of frame 1.

A motor drive mechanism and cable arrangement 5 are supported on four stationary posts 6, 7, 8 and 9 for raising and lowering frame 1 for washing vehicle 3. Mechanism 4 is equipped with up and down drive mechanism which is operable under control of an electrical control circuit 10. Posts 6–9 are secured on their floor at their lower platformed ends and are joined at their upper ends to a rectangular frame element 11 for forming a rigid structure supporting drive mechanism 4 and cable arrangement 5.

A normally closed limit switch LS1 is mounted on post 6 near its lower end. An operating arm of switch LS1 is positioned for engaging frame 1 during its downward movement to operate switch LS1 for activating control circuit 10 to cause further downward movement of frame 1 to stop. A normally opened limit switch LS2 is supported on post 6 near its lower end and above switch LS1. Switch LS2 is also operated by engagement with frame 1 in its downward movement for selectively activating control circuit 10 to cause a reduction in the flow of water to frame 1. Another normally opened limit switch LS3 is supported on post 7 near its lower end and it is operated by engagement with frame 1 in its downward movement for activating the control circuit 10 to advance the washing operations. A normally closed limit switch LS4 is mounted on post 8 near its upper end and it is actuated by engagement with frame 1 in its upward movement for activating circuit 10 to further upward movement of frame 1 at the end of a vehicle washing cycle.

As shown in FIG. 1, water and liquified detergent are selectively supplied from a respective water supply WS and detergent supply DS through respective water valves WV and WVA and a detergent valve DV to an electrically driven pump P which pumps supplied water and detergent through a flexible hose H to frame 1 for application to a vehicle 3 to be washed. Valves WV, WVA and DV are electrically actuatable under selective control of the control circuit 10 during various sequences of a vehicle washing operation to control the flow of water and detergent to pump P. It is advantageous to note that valve WV is illustratively a water reducer valve which in is deactuated state allows a prescribed amount of water to flow to pump P and in its actuated state allows a greater volume of water to flow to pump P.

All automatic control operations of the system are executed in response to instructions from the electrical control circuit 10. The latter receives various input signals from switches LS1–LS4 and a pressure switch PS, which is operated to energize an under-truck washer mechanism UTM when a vehicle 3 drives over it for a washing and, in response thereto, programmed to send electrical signals to valves WV and DV, the pump P and the up and down drive control mechanisms of the motor drive 4 for effecting the movement of frame 1 and the spraying of water and detergent onto a vehicle 3 to be washed.

Figure 2:
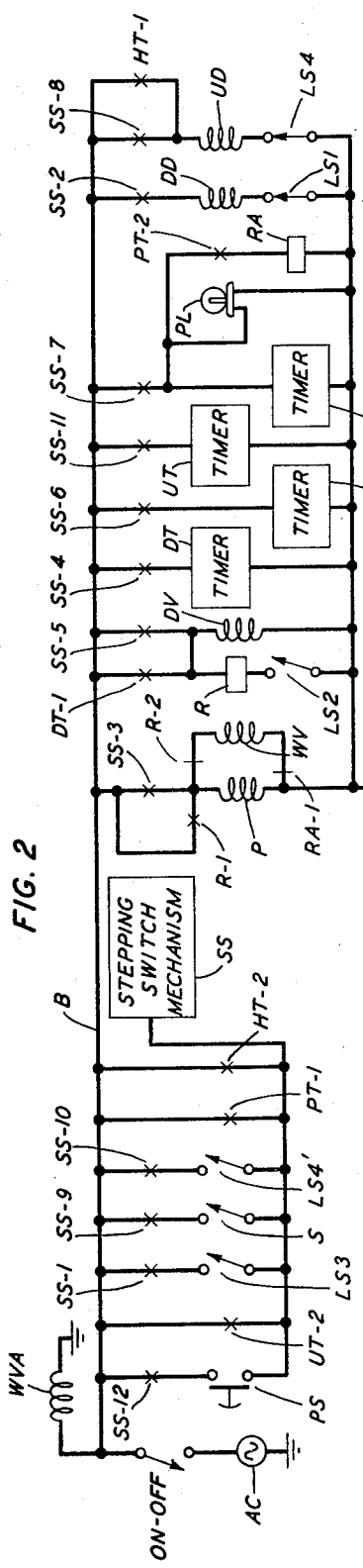
FIG. 2 is a schematic of the electrical control circuit.
Figure 3:
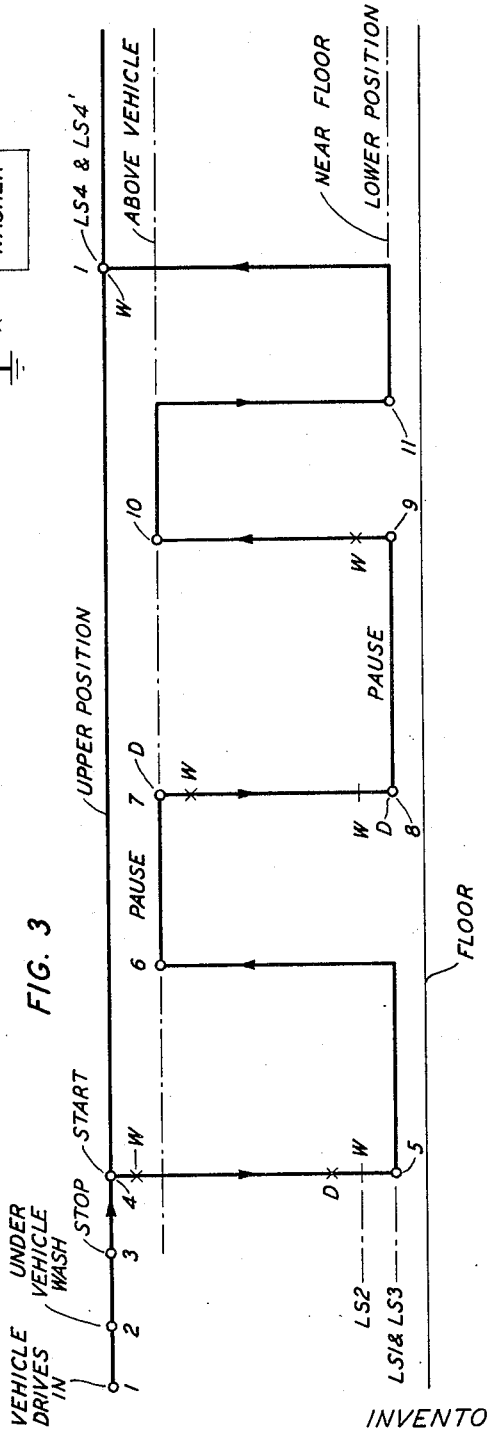
FIG. 3 is a flow chart of the sequence of stepping switch positions 1–11 and the spray frame movements in the spraying water and liquified detergent.

Referring to FIG. 2, the automatic operation of the vehicle washing system is initiated when the switch ON–OFF is switched to its ON position to close its contact and apply AC (alternating current) from the AC source AC to bus B. The latter operation actuates the water valve WVA to pass water from supply WS of FIG. 1 to valve WV whereby a prescribed volume of water flows through valve WV and hose H to spray frame 1. A stepping switch SS is at the same time resting in its position (1) as indicated in FIG. 3 with its contact SS–12 closed and awaiting a vehicle to be washed. Concurrently, spray frame 1 rests in its uppermost position. When a vehicle such as truck 3 is thereafter driven forward toward a position under frame 1 as shown in FIG. 1, it moves over and thereby actuates a pressure switch PS of FIGS. 1 and 2 which causes the operation of switch SS to step it to its position 2 for operating an under truck timer UT via contact SS–11. In operating, timer UT closes its contact UT–1 for activating an under the truck washer mechanism UTM to spray a predetermined liquified substance from its spray bar of FIG. 1 onto the under surfaces of truck 3 as it passes over the spray bar. After a predetermined time sufficient to allow for the washing of the vehicle under surface, timer UT actuates switch SS for stepping it to its position 3 in which further operations including the under surface washing are stopped to await the operation of a start switch S which initiates the spray frame 1 washing movement.

The operation of switch S connects AC power from bus B via contact SS–9 to switch SS for stepping it to its position 4. In stepping, switch SS energizes the down-drive mechanism DD of motor drive 4 of FIG. 1 for controlling the associated cable drive 5 to initiate the movement of spray frame 1 of FIG. 1 downward from its upper position as illustrated in FIGS. 1 and 3. Mechanism DD is energized over a path from ground via limit switch LS1, a control winding of mechanism DD and contact SS–2 to source AC. Operated switch SS also causes the operation of a pump P and water valve WV for pumping water to frame 1 via hose H for application to truck 3. Pump P is operated via SS switch contact SS–3. Valve WV is bridged in parallel with pump P via R and RA relay contacts R–2 and RA–1. In addition, a detergent timer DT is concurrently operated via contact SS–4 to time for a prescribed interval before closing its contact DT–1 to actuate the detergent valve DV and thus apply a liquified detergent and water concurrently from sources DS and WS through pump P via hose H to spray frame 1. The prescribed interval is shorter than the time needed for frame 1 to reach its lower position. Accordingly, at the end of the timed interval and during the downward movement of frame 1, contact DT–1 closes and actuates valve DV. Thereafter, during the further downward movement of frame 1, limit switch LS2 is operated by frame 1 to actuate relay R over the path through its winding and timer contact DT–1 to source AC. In operating, relay R closes its contact R–1 to provide an auxiliary operating path for pump P and opens its contact R–2 to deactivate valve WV for reducing the volume of water flow through pump P and hose H to frame 1 during the remainder of the present downward movement of frame 1. It is advantageous to note that, in accordance with the present invention, relay R may be deleted for certain washing applications and thus the reduction of water flow by the last described operation of valve WV may be eliminated at this stage of the washing cycle. As the frame 1 moves further downward, it operates limit switch LS1 for opening the operate circuit for down-drive mechanism DD to stop frame 1 in its lower position as indicated in FIGS. 1 and 3. Limit switch LS3 is also operated at about the same time by frame 1 to complete a path via contact SS–1 for step switch SS to its position 5.

In position 5, switch SS closes its contact 5 to retain valve DV opened to continue supplying detergent to frame 1 via pump P and hose H for application to truck 3. In addition, pump P is continuously operated by holding contact SS–3 closed while valve WV is deactuated by the priorly opened contact R–2. The stepping of switch SS to position 5 immediately causes height timer HT of FIG. 2 to operate the up-drive mechanism UD for immediately moving frame 1 upward. Mechanism UD is operated in a path via an upper position limit switch LS4, a control winding of mechanism UD and height timer contact HT–1. When frame 1 moves to a predetermined elevation below its upper position, but sufficient to spray the vehicle with a detergent and water mixture, timer HT causes the actuation of switch SS to step it to its position 6. The latter operation occurs by connecting source AC to switch SS via timer contact HT–2.

When in its position 6, switch SS deactuates timer HT by opening contact SS–6 for causing contact HT–1 to open the operate circuit for up-drive mechanism UD for stopping further upward movement of frame 1 at a location above track 3 and below the upper position of frame 1 as depicted in FIG. 3. The stepping of switch SS to position 6 opens its contact SS–5 to effect the release of relay R and detergent valve DV and also closes its contact SS–7 for actuating the pause timer PT and pause lamp PL. In releasing, relay R deactuates pump P. Thus, water and detergent spraying from frame 1 is stopped in position 6 for switch SS. Upon actuation, timer PT closes its contact PT–1 for operating relay RA. Timer PT times for an interval which enables the liquified detergent to penetrate and loosen dirt on truck 3. At the end of the interval, timer PT actuates switch SS to its position 7 in a path via contact PT–1.

The stepping of switch SS to its position 7 operates down-drive mechanism DD via contact SS-2 and switch LS1 for moving frame 1 downward. In position 7, switch SS closes its contact SS-5 to actuate the detergent valve DV for supplying detergent to pump P which is concurrently operated via contact SS-3. Timer PT is deactivated when switch SS steps to position 7 and opens its contact SS-7 which also causes the slow release of relay RA. In releasing, relay RA closes its contact RA-1 to operate valve WV for applying water to pump P after frame 1 moves downward a prescribed amount as shown in FIG. 3. Frame 1 thus in moving downward sprays detergent and water onto truck 3. Frame 1 moves downward until it actuates and closes limit switch LS2 for actuating relay R over the described path and it, in turn, deactivates valve WV via contact R-2 to reduce the volume of water flowing from frame SF to truck 3 while detergent continues to be sprayed from frame 1 onto truck 3. As frame 1 moves further downward, it operates limit switch LS1 to open the operate path for down drive mechanism DD for stopping further downward movement of frame 1 at its lower position. Limit switch LS3 is concurrently operated by frame 1 to complete a path via contact SS-1 for stepping switch SS to its position 8.

In position 8, switch SS opens its contact SS-5 to de-energize detergent valve DV and relay R. The release of relay R opens its contact R-1 which with the prior opening of contact SS-3 de-energizes pump P. Thus, the flow of detergent from frame 1 is stopped in SS switch position 8. The pause timer PT and lamp PL are operated in position 8 of switch SS via its contact SS-7. Timer PT immediately operates relay RA via contacts PT-2 and SS-7 and times for a pause interval to allow the detergent and water to penetrate and loosen dirt from truck 3. At the end of the interval, timer PT closes its contact PT-1 to step switch SS to its position 9.

The stepping of switch SS to position 9 closes its contact SS-8 to actuate up-drive mechanism UD for moving frame 1 upward. Switch SS also opens its contact 7 for causing the release of timer PT and lamp PL concurrent with the slow release of relay RA. The release of relay RA occurs after frame 1 has moved upward and causes the actuation of valve WV for applying a greater volume of water to pump P which is actuated via contact SS-3 when switch SS steps to position 9. Thus, water is sprayed from the upward moving frame 1 to truck 3 for rinsing detergent and dirt from truck 3. Height timer HT is also actuated in position 9 of switch SS via contact SS-6 for timing the upward movement of frame 1 so that it sprays all sides of truck 3 with a rinse water. When frame 1 reaches a prescribed height above truck 3, timer HT closes its contact HT-2 to step switch SS to its position 10.

Upon stepping to position 10, switch SS opens its contact SS-6 to deactivate timer HT for opening its contact HT-1 to deactivate the up-drive mechanism UD for arresting further upward movement of frame 1 at an elevation above truck 3. In position 10, contact SS-3 remains closed to maintain pump P and valve WV operated for continuing the spray of rinse water from frame 1 onto truck 3. Contact SS-2 is also closed to actuate the down-drive mechanism DD for moving frame 1 immediately downward while it sprays rinse water onto truck 3. Limit switch LS1 is opened as frame 1 reaches its lower position for deactivating mechanism DD for stopping further downward movement of frame 1. Switch LS3 is closed concurrently for stepping switch SS to its position 11.

In position 11, switch SS activates the up-drive mechanism UD by closing contact SM-8 for immediately moving frame 1 upward. Contact SS-3 also remains closed for maintaining pump P and valve WV actuated for supplying water to frame 1 during its upward movement for a final rinse of truck 3. Frame 1 continues its movement upward until after it actuates and closes limit switch LS4' which then steps switch SS to position 11 in which it rested prior to the actuation of pressure switch PS. This completes the wash cycle with frame 1 resting at its upper position whereat it freely allows truck 3 to be driven out in a washed condition.

The foregoing illustrates a feature of this invention that the valves WV and DV together with the pump P are operable for injecting water and detergent through hose H into the spray frame 1 for spraying the vehicle 3. Advantageously, valves WV and DV and pump P are operated automatically under control of the electrical control circuit 10 to initiate and terminate the injection of water into frame 1 at time different from the initiation and termination of the injection of the detergent into frame 1 for selectively spraying vehicle 3 with water alone or with a mixture of water and detergent.

In accordance with another salient aspect of the present invention, the vehicle washing system is further simplified in construction and operation by providing for the continuous flow of water through the spray frame 1 and advantageously injecting detergent into the water flow in desired proportions. This simplified system advantageously reduces the need for the water valve switching control mechanism, such as the valves WV and WVA, as well as the water valve control limit switch LS2 relays R and RA. The simplified system performs its vehicle washing functions in essentially the same steps as depicted in the flow chart of FIG. 3 with the functions being modified so that water is pumped through frame 1 whenever pump P is operated and while frame 1 is reciprocated in each direction between the upper and lower positions as shown in FIG. 1. Accordingly, water is supplied from water supply WS directly to pump P for coupling through hose H to frame 1 for spraying onto the truck 3. Pump P is energized by the electrical control circuit 10 during the vertical reciprocation of frame 1 in each direction between the upper and lower positions as shown in FIG. 1. Control circuit 10 also selectively actuates the valve DV, as previously explained, during a prescribed phase of the reciprocation of frame 1 to supply detergent from the supply DS to pump P for mixing with the pumped water. The latter mixture is thus selectively pumped through the coupling hose H to spray frame 1 for spraying onto the vehicle 3. It is, therefore, apparent that the simplified vehicle washing system advantageously sprays a vehicle 3 with water alone during wetting and rinsing operations and further sprays the vehicle with the supplied water and an injected amount of detergent during soaping operations of the washing cycle.

It is understood that the above-described arrangements are merely illustrative of the application of the principles of the invention. Numerous other arrangements may be devised by those skilled in the art without departing from the spirit and scope of the invention.

What is claimed is:

1. A vehicle washer comprising
   a spray frame for spraying a vehicle with a mixture of water and a detergent for washing and water alone for rinsing,
   means for reciprocating said spray frame between first and second positions to spray a vehicle for a washing thereof,
   means responsive to the entrance of said vehicle within said frame to turn-on said washer for continuously applying a prescribed volume of water into said spray frame for a purging thereof before during and after said washing and rinsing operations,
   means actuatable for injecting a detergent into said spray frame for concurrently spraying said vehicle with a detergent and said prescribed volume of water,
   and control means operative automatically during the reciprocation of said spray frame for actuating said injecting means to inject said detergent into said spray frame for mixture with said volume of water to spray wash said vehicle, and said control means including an electrical stepping means sequentially actuating said injecting means and applying means at different times for solely applying another prescribed volume of water into said spray frame during reciprocation of said spray frame to rinse said vehicle.

2. Equipment for washing a vehicle comprising
a spray frame,
means for vertically reciprocating said frame between upper and lower positions to spray a vehicle,
means supplying a first liquid,
means supplying a second liquid,
means operable for injecting said first and second liquids into said frame for spraying said vehicle,
and electrical control means including a stepping sequence circuit automatically activated by the entry of said vehicle within said frame for a washing for operating said injecting means sequentially to initiate and terminate the injection of said first liquid into said frame only at times different from the initiation and termination of the injection of said second liquid into said frame and during said reciprocating movement of said frame for selectively spraying said vehicle with said first liquid alone and with a mixture of said first and second liquids and said operated injecting means being effective for continuously supplying from said first liquid supplying means a prescribed purging liquid into said frame before during and after said spraying of said vehicle.

3. The invention set forth in claim 2
wherein said reciprocating means includes down-drive and up-drive means actuatable for moving said spray frame between said upper and lower positions,
said electrical control circuit comprises
   first means operative for actuating said down-drive means for moving said frame from said upper to said lower position,
   means responsive to the movement of said frame to said lower position for deactivating said down-drive means to arrest the downward movement of said frame,
   timer means controllable by said first means and said stepping sequence circuit for timing the upward movement of said frame from said lower to said upper position,
   second means controlled by said timer means at the start of said timing for actuating said up-drive means for moving said frame from said lower toward said upper position,
   and third means operated by said timer means at the end of said timing to deactuate said up-drive means to arrest the upward movement of said frame.

4. In a vehicle washer having
a spray frame for spraying water and detergent on prescribed surfaces of a vehicle to be wahed,
motor means including up-drive and down-drive means operable for vertically reciprocating said frame to spray said vehicle,
means activatable for washing under surfaces of a vehicle,
and an electrical control circuit comprising a stepping switch mechanism actuatable in a plurality of step positions for controllably operating said up-drive and down-drive means for reciprocation of said frame and said washing means for said vehicle under surfaces, and comprising
means operable for timing the washing of said vehicle under surfaces,
switch means responsive to the movement of said vehicle into a wash position under said frame for actuating said mechanism from a first to a second step position for causing the operation of said timing means,
means responsive to the operation of said timing means for activating said under surfaces washing means,
means controlled by said timing means at the end of said under surfaces washing timing for actuating said mechanism to a third step position for deactivating said under surfaces washing means,
start means for actuating said mechanism to a fourth step position for causing said down-drive and up-drive means to operate for vertically reciprocating said frame to spray said vehicle with water and detergent.

5. In a vehicle washer as set forth in claim 4, the combination wherein said electrical control circuit further comprises
first means responsive to the stepping of said mechanism to said fourth position for actuating said down-drive means for moving said spray frame from an upper position toward a lower position,
further having means supplying water,
pump means for pumping water and detergent to said frame,
valve means operable for injecting said supplied water into said pump means for pumping to said frame for spraying on said vehicle,
second means responsive to the stepping of said mechanism to said fourth position for operating said valve means to inject said supplied water into said pump for pumping to said frame to spray said vehicle,
a detergent timer responsive to the stepping of said switch to said fourth position for generating a timed interval during the downward movement of said frame,
means supplying a detergent,
a valve device operable for injecting said supplied detergent into said pump means for pumping to said frame for spraying onto said vehicle,
third means controlled by said detergent timer for operating said valve device for injecting said supplied detergent into said pump means,
means including a relay and a first limit switch actuated by the movement of said frame for subsequently releasing said valve means to reduce the volume of said water injection into said pump means,
a second limit switch actuated by the movement of said frame to said lower position for deactuating said down-drive means,
and a third limit switch for stepping said switch to a fifth position for actuating said up-drive means for moving said frame upward from said lower position.

6. In a vehicle washer as set forth in claim 5, the combination further comprising
a height timer responsive to said mechanism stepping to said fifth position for generating another timed interval for the movement of said frame toward said upper position,
means responsive at the end of said other timed integral for stepping said mechanism to a sixth position for deactuating said up-drive means and releasing said valve device,
a pause timer responsive to said mechanism stepping to said sixth position for generating a standby interval,
means controlled by said pause timer at the end of said standby interval for stepping said mechanism to a seventh position for actuating said down-drive means to move said frame downward toward said lower position,
and said second means being operated by said mechanism stepping to said seventh position for operating said valve device for injecting supplied detergent into said pump means for pumping to said frame for spraying on said vehicle.

7. In a vehicle washer as set forth in claim 6, the combination further comprising another relay being controlled by said pause timer for operating said valve means for increasing the volume of supplied water injected into said pump means for mixing with said injected supplied detergent therein and pumping into said frame for spraying on said vehicle, and wherein said first limit switch is thereafter actuated by the downward movement of said frame for releasing said valve means, said second limit switch being actuated by the movement of said frame to said lower position for deactuating said down-drive means, said third limit switch being actuated by the movement of said frame to said lower position for stepping said mechanism to an eighth position, said pause timer being responsive to said mechanism, stepping to said eighth position for generating said standby interval, said means controlled by said pause timer at the end of said standby interval for stepping said switch to a ninth position, and said up-drive actuating means being operated by said mechanism stepping to said ninth position for actuating said up-drive means to move said frame toward said upper position.

8. In a vehicle washer as set forth in claim 7, the combination wherein said other relay is subsequently controlled by said pause timer for operating said valve means to inject supplied water into said pump means for pumping into said spray frame for spraying on said vehicle, said height timer being responsive to said mechanism stepping to said ninth position for generating said other timed interval for the movement of said frame toward said upper position, said means controlled by said height timer being effective for stepping said mechanism to a tenth position, said up-drive means being deactuated upon said switch stepping to said tenth position and said down-drive actuating means being operated for actuating said down-drive means to move said frame toward said lower position, said second limit switch being thereafter actuated for deactuating said down-drive means, said third limit switch being actuated by the movement of said frame for stepping said switch to an eleventh position, said up-drive actuating means being thereafter operated by said mechanism stepping to said eleventh position for actuating said up-drive means for moving said frame upward from said lower to said upper position, a fourth limit switch being actuated by the movement of said frame to said upper position for deactuating said up-drive mechanism, and a fifth limit switch being thereafter actuated for stepping said switch to said first position.

References Cited

UNITED STATES PATENTS

| | | | |
|---|---|---|---|
| 2,689,577 | 9/1954 | Dunn et al. | 134—123 |
| 3,024,795 | 3/1962 | Roller et al. | 134—123 XR |
| 3,088,472 | 5/1963 | Haines | 134—123 XR |
| 3,102,545 | 9/1963 | Knight et al. | 134—45 |
| 3,258,019 | 6/1966 | Bellas et al. | 134—123 XR |
| 3,321,793 | 5/1967 | Braunger | 134—45 XR |
| 3,351,076 | 11/1967 | Haines | 134—123 XR |

ROBERT L. BLEUTGE, Primary Examiner

U.S. Cl. X.R.

134—100